May 19, 1970 J. G. KELSO Re. 26,879

PROCESS FOR MAKING METAL BONDED DIAMOND TOOLS EMPLOYING SPHERICAL PELLETS OF METALLIC POWDER-COATED DIAMOND GRITS

Original Filed Aug. 2, 1961

INVENTOR
JOHN G. KELSO

ATTORNEY

United States Patent Office

Re. 26,879
Reissued May 19, 1970

26,879

PROCESS FOR MAKING METAL BONDED DIAMOND TOOLS EMPLOYING SPHERICAL PELLETS OF METALLIC POWDER-COATED DIAMOND GRITS

John G. Kelso, Schenectady, N.Y., assignor to Norton Company, Worcester, Mass., a corporation of Massachusetts Original No. 3,316,073, dated Apr. 25, 1967, Ser. No. 128,895, Aug. 2, 1961. Application for reissue Apr. 22, 1969, Ser. No. 822,076
Int. Cl. B24d *3/02;* B24b *1/00*
U.S. Cl. 51—295 2 Claims

Figure 1:
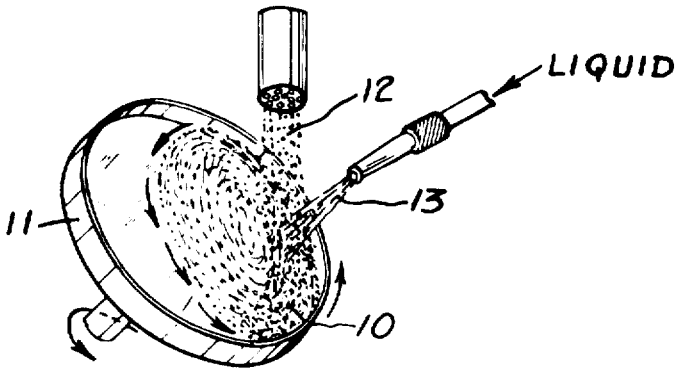

Matter enclosed in heavy brackets [ ] appears in the original patent but forms no part of this reissue specification; matter printed in italics indicates the additions made by reissue.

This invention relates to a method for forming bonded abrasive shapes wherein the abrasive particles are uniformly and controllably spaced throughout the working portion of the shape.

The invention has particular application to the manufacture of abrasive tools whereon relatively large size hard abrasive particles are widely spaced apart in the bonding medium. Where the number of abrasive particles is small relative to the surface over which or volume throughout which the particles are distributed, conventional methods of mechanically mixing the abrasive particles with the bond prior to the formation of the desired shape have resulted in tools having an undesirable nonuniformity of distribution of the abrasive particles.

Prior to the present invention, in applications where relatively large abrasive particles are employed and the volume of abrasive particles is less than one-half the volume of the grinding section such as diamond core drills, diamond bits, and diamond wheels, it has, in some cases, been the practice to hand set, individually, each separate abrasive particle in the tool. Such methods besides being slow and expensive, did not always result in a good mechanical fastening of the diamonds to the tool.

It is therefore an object of this invention to provide an efficient method for producing bonded abrasive tools having a uniform distribution of abrasive grain firmly bonded to the working surface of the tool, or throughout the usable portion of the tool.

Another object of the invention is to produce spherical, uniform sized bodies useful in forming abrasive bodies comprising a central abrasive particle surrounded by a matrix forming material.

Still another object of the invention is to improve the distribution of abrasive particles in an abrasive tool and at the same time improve the flow characteristics of the tool forming materials for introduction into the mold.

This is particularly important where sintered wheels are to be formed by automatic equipment from a mix consisting of powdered metal (or cerments) and abrasive particles. Previous to the present invention the caky, sticky, nature of such mixture has been a major difficulty in the use of such materials in equipment in which a controlled amount of prepared mix is automatically dispensed from a supply hopper into the automatic press. The use of the balls of the present invention entirely solves the problem of flow of the mix in such equipment.

The above objects and other objects which will be apparent to those skilled in the art are achieved in this invention by the use of spherical pellets from which the grinding shapes are formed. The pellets consist of a central particle of primary abrasive material of grit size 60 or larger, surrounded by a particulate, self-sustaining mass of matrix forming material which may also include secondary abrasive particles of grit 80 or finer although best results are achieved without addition of finer abrasive material. The matrix material contains a sinterable material which upon application of heat will weld together to form a permanent strong bond for the abrasive particles. In some cases a temporary binder may be employed to make the pellets self-sustaining and strong enough to withstand handling prior to formation into a finished fired product. Such a temporary binder is conveniently an organic material such as dextrine or shellac.

In order to form a grinding shape according to the invention, a mold of the desired shape is filled with a quantity of the abrasive containing pellets of substantially uniform size. Pressure in the order of from 20 to 70 tons per square inch is then applied to form a compacted grinding shape having primary abrasive grain spaced uniformly throughout the volume of the body. The body is then subjected to heat to sinter the matrix. The particular temperature employed and the conditions of firing will depend upon the particular abrasive and matrix materials used.

Figure 2:
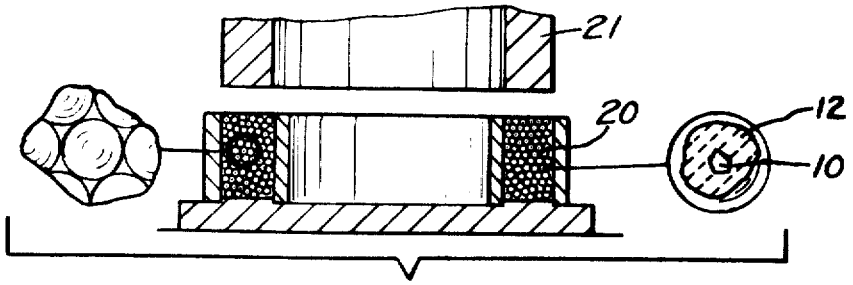

The invention will now be described in detail with reference to specific examples and with reference to the accompanying drawings in which:

FIGURE 1 shows, somewhat schematically, one method of forming the pellets of the invention; and FIGURE 2 shows a cross section of a mold containing spherical pellets ready to be formed into a grinding shape.

Referring now specifically to FIG. 1, the starting material 10, consisting only of abrasive particles, is placed in a rotating round pan 20. If desired an organic surface-active wetting agent may be added to the abrasive particles.

The axis of rotation of the pan is inclined at about 45° to the horizontal. The angle of inclination and the speed of rotation are selected so that the material in the pan is rolling over itself and is not held to the walls of the pan by centrifugal force. The powdered matrix material and temporary binder mixture 12 is added to the starting material at a controlled feed rate and a solvent 13 for the temporary binder may be added. The powder tends to build up, as a snowball does, on the abrasive grain and as more material is added the thickness of the coating is increased. The feed rate of the ingredient is controlled so that each pellet grows from one abrasive grain and pellets are not agglomerated to each other. When the desired thickness of coating is obtained the pellets are removed and are ready for use in the mold. Preferably the pellets are dried before use.

When the pellets are placed in a mold cavity 20, as shown in FIG. 2, the abrasive particles are uniformly spaced from each other. Under molding pressure, applied by member 21, the ball is broken down and normal compaction can take place.

Although a "temporary binder" has been referred to, it has been found that in many cases simply wetting the ingredients with water in the form of a spray during formation of the spheres is sufficient to produce a sufficient cohesiveness in the balls even after they have been dried.

Example I. Preparation of Pellets

As an illustrative example of the preparation of the spherical pellets, a mixing bowl, eight inches in diameter and three inches deep was employed. The axis of rotation of the bowl was inclined at 47° to horizontal and the speed of rotation was 52 r.p.m. Aluminum oxide grain, 36 grit, was used as the starting seed. The metal powder bond was a 50/50 by weight blend of tungsten carbide particle size 1.5 microns and cobalt powder of 1.5 microns maximum average particle size. About 1% of paraffin, by weight, was included. Finely powdered dextrine, 1% by weight, was thoroughly mixed with the metal powder. The mixed powders were sifted slowly onto the abrasive in the rotating bowl while a fine spray of water was directed onto the abrasive. The rate of addition of water was kept low enough so that the abrasive grains did not adhere to the walls of the bowl or to each other. The rate of addition of the metal powder and dextrine mixture was controlled so that the tumbling action of the abrasive was not impaired. The process was stopped when a large number of particles larger than 16 mesh had been formed. After drying, the pellets were screened. The results were:

| Screen, mesh: | Weight percent |
|---|---|
| On 12 | 1.3 |
| Through— | |
| 12 on 16 | 63.0 |
| 16 on 18 | 18.0 |
| 18 on 24 | 15.8 |
| 24 on 34 | 1.4 |
| 34 on 44 | 0.3 |
| 44 on 54 | 0.1 |
| 54 | 0.1 |

Examination of 100 randomly selected spheres which were coarser than 24 mesh showed that 99% contained only one abrasive particle.

Example II

In a second test a bowl with a flat bottom, 5⅛" diameter and 1½" deep was used. The pellets were formed in the manner described in Example I and the following results were obtained:

| Screen, mesh: | Weight percent |
|---|---|
| On 12 | 0 |
| Through— | |
| 12 on 16 | 66.3 |
| 16 on 18 | 6.4 |
| 18 on 24 | 16.2 |
| 24 on 34 | 8.9 |
| 34 on 44 | 1.1 |
| 44 | 1.1 |

From the above data given in Examples I and II, it follows that in both cases the bulk of the pellets had a bond volume to abrasive volume ratio of at least [9] 5 to 1.

Other tests have been conducted successfully using steel bond powder (95¼% Fe, 4% Ni, and 0.75% C, with an average particle size of 10 microns) to make pellets. Pellets coarser than 6-mesh have been made and no reason is seen why larger pellets cannot be made. As primary abrasive, the finest that has been successfully used has been 60-grit alumina. Grits as coarse as 16-grit diamonds, and tungsten carbide which passed through screen 5 on screen 8 have been employed.

In order to evaluate the effect of pelletizing on abrasive distribution, test wheels were made. The wheel was made with 36-grit diamond, 2.06% by weight, and 50% WC–50% Co powder as mentioned above. The bowl was rotating at 52 r.p.m. and inclined at 47°. In order to wet the diamond a wetting agent, "Daxad" (#11 Daxad powder, Dewey & Almy Chemical Co., 62 Whittemore Ave., Cambridge 40, Mass.) was added to the water at 1% by volume. Pellets were generated as in the previous cases except that the pellets were screened to separate out those which were between 10- and 12-mesh size. The minus-12-mesh particles were put back in the bowl for further growth. The selected minus-10 plus-12 mesh particles were pressed into a grinding wheel.

A second test wheel was made from pellets which were prepared by mixing the correct ratio of ingredients but without any regard to the size range of particles produced. Bowl operating conditions were as above. The random sized pellets were molded into a grinding wheel.

These two items were compared with a grinding wheel of the same composition which was pressed in the same mold. Both of the wheels made from pellets showed better diamond distribution than the control item. The minus 10 plus 12 mesh pellet wheel appeared to have the most uniform distribution of the three.

The process of this invention is applicable to primary abrasive grains, preferably diamond, of 60-grit and coarser, up to 50% by volume. Secondary abrasive grain of any grit size, generally $Al_2O_3$, SiC, WC, and $W_2C$ may also be employed. When the secondary abrasive grain is 60-grit or coarser the secondary abrasive is mixed with the primary abrasive in the pelletizing process. When the secondary abrasive is 80-grit and finer, it is mixed with the bond material and added as a powder constituent.

Wheels or other grinding shapes may be formed from the pellets by any of the known methods of the art applicable to the particular bond material and abrasive material employed in making the pellets. Hot pressing may be employed to form metal bonded finished shapes or cold pressing followed by sintering in an oven, in an inert atmosphere when necessary, may be employed. The latter methods are particularly suited to forming metal bonded (sintered) diamond wheels. Typical metal powders useful in this invention have particle sizes from 1 to 12 microns and may be cobalt, mixtures of tungsten carbide and cobalt, steel mixtures, and copper and tin mixtures.

U.S. Patent 2,737,454 to Danec gives a complete description, for example, of how grinding elements are prepared when a copper-tin bond powder is employed. A copper content of 81.4 wt. percent and tin content of 18.6 wt. percent, as disclosed in the Danec patent is suitable. The preformed pellets such as selected minus-10 plus-12 mesh are placed in the mold of FIG. 2 and pressed, as taught in the Danec patent, at 35 tons per square inch. The "green" shape is then fired for approximately 5 hours at 600° C. in an atmosphere of dry oil pumped nitrogen. The rise during furnacing to the 5-hour soak at 600° C. is preferably at a rate of about 75° C. per hour. With different metal bonds the same technique may be employed except that the sintering temperatures will vary depending on the bond employed.

In order to produce a good distribution of primary abrasive particles in the finished abrasive wheel or tool, it is not necessary to employ pellets of all the same size. In fact, where the abrasive particles are widely spaced it is sometimes desirable to employ a mixture of pellets of more than one size to avoid too definite a pattern in the abrasive spacing. For example, in making a diamond cutoff wheel segment, I may employ a mixture of equal parts by weight of 10-mesh pellets each with a 24-grit diamond center and 12-mesh pellets each with a 36-grit diamond center.

What is claimed is:

1. A method of forming bonded abrasive shapes comprising forming a plurality of generally spherical pellets consisting of a single central primary diamond particle surrounded by a sinterable particulate mass of powdered metallic bonding material adapted to weld together to form a bond upon the application of heat, and forming said plurality of generally spherical pellets to shape by the application of pressure to break down the spherical shape and compact the pellets and heat to sinter the bond.

2. A mass of spherical pellets for making a diamond abrasive tool each pellet consisting of an individual diamond abrasive grain of grit 60 or coarser surrounded by a temporarily self-sustaining powdered unsintered tungsten carbide-cobalt powder, the bulk of the pellets having a bond volume to abrasive volume of at least [9] 5 to 1.

(References on following page)

References Cited

The following references, cited by the Examiner, are of record in the patented file of this patent or the original patent.

UNITED STATES PATENTS

| | | | |
|---|---|---|---|
| 2,042,635 | 6/1936 | Schellens | 51—309 |
| 2,162,600 | 6/1939 | Ball | 51—298 |
| 2,319,331 | 5/1943 | Kurtz | 51—309 |
| 2,416,867 | 12/1946 | Brenner | 51—309 |
| 2,737,454 | 3/1956 | Danec | 51—309 |
| 2,877,103 | 3/1959 | Lane | 51—308 |
| 2,943,926 | 7/1960 | Goepfert | 51—298 |
| 2,947,124 | 8/1960 | Madigan et al. | 51—308 |
| 2,986,455 | 5/1961 | Sandmeyer | 51—296 |

FOREIGN PATENTS

| | | |
|---|---|---|
| 594,400 | 3/1960 | Canada. |
| 837,013 | 6/1960 | Great Britain. |

OTHER REFERENCES

Handbook of Chemistry and Physics, 37th edition, 1955–1956, pp. 3062–3065, Chemical Rubber Publication Co.

DONALD J. ARNOLD, Primary Examiner

U.S. Cl. X.R.

51—309